US009639900B2

(12) United States Patent
Huang et al.

(10) Patent No.: US 9,639,900 B2
(45) Date of Patent: *May 2, 2017

(54) SYSTEMS AND METHODS FOR TAX DATA CAPTURE AND USE

(71) Applicant: INTUIT INC., Mountain View, CA (US)

(72) Inventors: Nankun Huang, San Diego, CA (US); Amir Eftekhari, San Diego, CA (US); Carol A. Howe, San Diego, CA (US); Alan B. Tifford, San Diego, CA (US); Jeffrey P. Ludwig, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,662

(22) Filed: Feb. 8, 2016

(65) Prior Publication Data
US 2016/0155202 A1   Jun. 2, 2016

Related U.S. Application Data

(63) Continuation of application No. 13/781,393, filed on Feb. 28, 2013, now Pat. No. 9,256,783.

(51) Int. Cl.
*G06K 9/34* (2006.01)
*G06Q 40/00* (2012.01)
*G06K 9/00* (2006.01)

(52) U.S. Cl.
CPC ....... *G06Q 40/123* (2013.12); *G06K 9/00449* (2013.01); *G06K 9/00463* (2013.01)

(58) Field of Classification Search
CPC .......... G06K 9/00463; G06K 9/00449; G06Q 40/123
See application file for complete search history.

(56) References Cited

U.S. PATENT DOCUMENTS 6,317,782 B1 * 11/2001 Himmel ................ G06Q 30/02
                                                        705/14.53
6,993,502 B1 *  1/2006 Gryglewicz ......... G06Q 20/207
                                                        705/19

(Continued)

FOREIGN PATENT DOCUMENTS

JP   2003006556 A   1/2003
JP   2004145663 A   5/2004

(Continued)

OTHER PUBLICATIONS http://support.google.com/drive/bin/answer.py?hl=en&answer=176692, printed: Mar. 18, 2013 (2pgs.).

(Continued)

*Primary Examiner* — Amir Alavi
(74) *Attorney, Agent, or Firm* — Vista IP Law Group LLP

(57) ABSTRACT

A computer-implemented method of acquiring tax data for use in tax preparation application includes acquiring an image of at least one document containing tax data therein with an imaging device. A computer extracts one or more features from the acquired image of the at least one document and compares the extracted one or more features to a database containing a plurality of different tax forms. The database may include a textual database and/or geometric database. The computer identifies a tax form corresponding to the at least one document from the plurality of different tax forms based at least in part on a confidence level associated with the comparison of the extracted one or more features to the database. At least a portion of the tax data from the acquired image is transferred into corresponding fields of the tax preparation application.

29 Claims, 8 Drawing Sheets

(56) References Cited

U.S. PATENT DOCUMENTS

| | | | |
|---|---|---|---|
| 7,561,734 B1* | 7/2009 | Wnek | G06F 17/243 382/159 |
| 7,764,830 B1 | 7/2010 | Wnek | |
| 7,769,646 B2* | 8/2010 | Wyle | G06F 17/243 705/19 |
| 7,844,915 B2 | 11/2010 | Platzer et al. | |
| 8,156,018 B1 | 4/2012 | Quinn et al. | |
| 8,606,665 B1 | 12/2013 | Shaw | |
| 8,793,574 B2 | 7/2014 | Curtis | |
| 8,885,951 B1* | 11/2014 | Cristofano | G06K 9/00449 382/173 |
| 9,256,783 B2* | 2/2016 | Huang | G06K 9/00463 |
| 2001/0049274 A1 | 12/2001 | Degraeve | |
| 2002/0080200 A1 | 6/2002 | Wong | |
| 2005/0010780 A1 | 1/2005 | Kane et al. | |
| 2006/0107312 A1 | 5/2006 | Fiske | |
| 2006/0178961 A1 | 8/2006 | Stanley et al. | |
| 2006/0271451 A1 | 11/2006 | Varughese | |
| 2007/0033118 A1 | 2/2007 | Hopkinson | |
| 2007/0053611 A1 | 3/2007 | Wnek | |
| 2007/0168382 A1 | 7/2007 | Tillberg et al. | |
| 2008/0319882 A1 | 12/2008 | Wyle | |
| 2009/0070207 A1 | 3/2009 | Engel et al. | |
| 2009/0228380 A1 | 9/2009 | Evanitsky | |
| 2010/0161460 A1 | 6/2010 | Vroom et al. | |
| 2011/0219427 A1 | 9/2011 | Hito et al. | |
| 2012/0194837 A1 | 8/2012 | Kamata | |
| 2012/0215669 A1 | 8/2012 | Lieberman et al. | |
| 2013/0036347 A1 | 2/2013 | Eftekhari | |
| 2013/0173915 A1 | 7/2013 | Haulund | |
| 2014/0244455 A1* | 8/2014 | Huang | G06Q 40/123 705/31 |
| 2014/0244456 A1* | 8/2014 | Huang | G06Q 40/123 705/31 |
| 2015/0019413 A1 | 1/2015 | Lazarus | |
| 2016/0155202 A1* | 6/2016 | Huang | G06K 9/00463 382/176 |

FOREIGN PATENT DOCUMENTS

| | | | |
|---|---|---|---|
| JP | 2006133933 A | 5/2006 | |
| JP | 2010128964 A | 6/2010 | |
| KR | 100883390 B1 | 2/2009 | |
| KR | 1020090064267 A | 6/2009 | |
| WO | 2012137214 A1 | 10/2012 | |

OTHER PUBLICATIONS http://www.freewaregenius.com/how-to-extract-text-from-images-a-comparison-of-free-ocr-tools/, printed: Mar. 18, 2013 (16pgs.).
hittp://www.nuance.com/for-individuals/by-product/omnipage/index.htm, printed: Mar. 18, 2013, (2pgs.).
http://www.miteksystems.com/, printed: Mar. 18, 2013, (3pgs.).
http://www.abbyy.com/solutions/mobile/, printed: Mar. 18, 2013, (1pg.).
http://blog.turbotax.intuit.com/2011/01/14/taxes-on-your-mobile-phone-it%E2%80%99s-a-snap/, printed: Mar. 18, 2013, (2pgs.).
PCT International Search Report dated Nov. 27, 2013 in International Application No. PCT/US2013/040628 filed May 10, 2013, Form ISA 220 and 210, (5 pages).
PCT Written Opinion dated Nov. 27, 2013 in International Application No. PCT/US2013/040628 filed May 10, 2013, Form ISA 237, (7 pages).
PCT International Search Report dated Nov. 22, 2013 in International Application No. PCT/US2013/040647 filed May 10, 2013, Form ISA 220 and 210, (5 pages).
PCT Written Opinion dated Nov. 22, 2013 in International Application No. PCT/US2013/040647 filed May 10, 2013, Form ISA 237, (8 pages).
PCT International Search Report dated Dec. 19, 2013 in International Application No. PCT/US2013/040620 filed May 10, 2013, Form ISA 220 and 210, (6 pages).
PCT Written Opinion dated Dec. 19, 2013 in International Application No. PCT/US2013/040620 filed May 10, 2013, Form ISA 237, (13 pages).
Office Action dated Feb. 4, 2014 in U.S. Appl. No. 13/781,571 filed Feb. 28, 2013, (8 pages).
Amendment filed May 5, 2014 in U.S. Appl. No. 13/781,571, filed Feb. 28, 2013, (17 pages).
http://www.apple.com/osx/what-is/gestures.html#gallery-gestures-tap-zoom, printed: Mar. 18, 2013, (3pgs.).
http://oauth.net/, printed: Mar. 18, 2013, (1pg.).
http://en.wikipedia.org/wiki/OAuth, printed: Mar. 18, 2013, (9pgs.).
Restriction Requirement dated Apr. 2, 2015 in U.S. Appl. No. 13/781,540, filed Feb. 28, 2013, (7pages).
Non-Final Office Action dated Dec. 2, 2014 in U.S. Appl. No. 13/781,571, filed Feb. 28, 2013, (17pages).
Response to Non-Final Office Action dated Apr. 2, 2015 in U.S. Appl. No. 13/781,571, filed Feb. 28, 2013, (25pages).
Non-Final Office Action dated Apr. 16, 2015 in U.S. Appl. No. 13/781,540, filed Feb. 28, 2013, (39pages).
Amendment dated Jul. 16, 2015 in U.S. Appl. No. 13/781,540, filed Feb. 28, 2013, (31pages).
Final Office Action dated Jun. 10, 2015 in U.S. Appl. No. 13/781,571, filed Feb. 28, 2013, (27pages).
PCT International Preliminary Report on Patentability (Chapter I of the Patent Cooperation Treaty) for PCT/US2013/040628, Applicant: INTUIT Inc., Form PCT/IB/326 and 373, dated Sep. 11, 2015 (9pp).
Final Office Action dated Sep. 3, 2015 in U.S. Appl. No. 13/781,540, filed Feb. 28, 2013, (17pp).
PCT International Preliminary Report on Patentability (Chapter I of the Patent Cooperation Treaty) for PCT/US2013/040647, Applicant: INTUIT Inc, Form PCT/IB/326 and 373, dated Sep. 11, 2015 (11pp).
PCT International Preliminary Report on Patentability (Chapter I of the Patent Cooperation Treaty) for PCT/US2013/040620, Applicant: INTUIT Inc, Form PCT/IB/326 and 373, dated Sep. 11, 2015 (15pp).
Amendment and Response dated Oct. 12, 2015 in U.S. Appl. No. 13/781,571, filed Feb. 28, 2013, (57pp).
Response to Final Office Action and Request for Continued Examination dated Feb. 10, 2017 in U.S. Appl. No. 13/781,540, (36 pages).
Final Office Action dated Feb. 10, 2017 in U.S. Appl. No. 13/781,571, (25 pages).
Examination report No. 2 for standard patent application in Australian Patent Application No. 2013379776, (5 pages).
Response dated Feb. 23, 2017 in Canadian Patent Application No. 2,901,815, (19 pages).
Response dated Jan. 30, 2017 in European Patent Application No. 13876201.8, (15 pages).
Examination—Response to an Examiner's Report dated Jan. 31, 2017 in Australian Patent Application No., (46 pages).
Response dated Feb. 23, 2017 in Canadian Patent Application No. 2,901,804, (30 pages).
Response dated Mar. 3, 2017 in Canadian Patent Application No. 2,900,818, (6 pages).
Tax Import: Importing Scanned Documents [Viewed on internet on Aug. 10, 2016] Viewed on internet. <URL:https://www.youtube.com/watch?v=MDz-UHPukBy>. Reference is cited in Australian Patent Application No. 2013379776, (1 page).

* cited by examiner

= DETECTED LINES

☐ CORRECTED (if checked)

| and telephone no. | Payer's RTN (optional) | OBM No 1545-0112 | |
|---|---|---|---|
| | 1 Interest income<br>$ 235.86 | 2012<br>Form 1099-INT | Interest |
| | 2 Early withdrawal penalty<br>$ | | |
| identification number | 3 Interest on U.S. Savings Bonds and Treas obligations<br>$ | | |
| | 4 Federal income tax withheld<br>$ | 5 Investment expenses<br>$ | inf<br>furr<br>Re |
| | 6 Foreign tax paid<br>$ | 7 Foreign country or U.S. possession | pen:<br>may l<br>this ir<br>the lf<br>h |
| | 8 Tax-exempt interest<br>$ | 9 Specified private activity bond interest<br>$ | |
| | 10 Tax-exempt bond CUSIP no. | 11 State | 12 State identification no | 13<br>$ |
| eep for your records) | | Department of the Treasury - Inter | |

FIG. 3B

= PARAGRAPH OUTLINE

Please note that the account number and the Social Security/Tax Identification Number (SSN/TIN) have been masked to protect your personal information. Both numbers were submitted to the Internal Revenue Service as required. To obtain a copy of the form submitted to the IRS which includes the full account number and SSN/TIN, please call (877) 732-2848 or send a secure message via SDCCU's Internet Branch.

FIG. 3C

SYSTEMS AND METHODS FOR TAX DATA CAPTURE AND USE

CROSS REFERENCE TO RELATED APPLICATION

This application is a continuation of U.S. application Ser. No. 13/781,393, filed Feb. 28, 2013 and entitled SYSTEMS AND METHODS FOR TAX DATA CAPTURE AND USE, issued as U.S. Pat. No. 9,256,783 on Feb. 9, 2016, priority of which is claimed under 35 U.S.C. §120 and all other applicable statutes, and the contents of which are incorporated herein by reference as though set forth in full.

SUMMARY

In one embodiment, a computer-implemented method of acquiring tax data for use in tax preparation application includes acquiring an image of at least one document containing tax data therein with an imaging device. A computer extracts one or more features from the acquired image of the at least one document and compares the extracted one or more features to a database containing a plurality of different tax forms. The database may include a textual database and/or geometric database. The computer identifies a tax form corresponding to the at least one document from the plurality of different tax forms based at least in part on a confidence level associated with the comparison of the extracted one or more features to the database. At least a portion of the tax data from the acquired image is transferred into corresponding fields of the tax preparation application.

In another embodiment, a method for preparing at least a portion of a tax return with tax preparation application includes acquiring an image of at least one document containing tax data therein with an imaging device and extracting one or more features from the acquired image of the at least one document with a computing device. A tax form corresponding to the at least one document is identified by the computing device from a plurality of different tax forms based at least in part on a confidence level associated with a comparison of the extracted one or more features to a database using the computing device. At least one field of an interview screen generated by the tax preparation application is automatically populated with at least a portion of the tax data from the acquired image of the at least one document.

In another embodiment, a system for preparing at least a portion of a tax return with tax preparation application includes an imaging device and a computing device configured to receive an image of at least one document containing tax data therein obtained by the imaging device, the computing device configured to extract one or more features from the acquired image of the at least one document and identifying a tax form corresponding to the at least one document from a plurality of different tax forms based at least in part on a confidence level associated with a comparison of the extracted one or more features to a database operatively connected to the computing device, the computing device further configured to populate at least one field of the tax preparation application with at least a portion of the tax data from the acquired image of the at least one document.

In still another embodiment, a method of using tax preparation application contained in a portable electronic device includes acquiring an image of a document containing tax data therein with the portable electronic device and transmitting the image from the portable electronic device to a remotely located computing device. One or more features from the acquired image are extracted with the computing device. A tax form corresponding to the document is identified by the computing device from a plurality of different tax forms based at least in part on respective confidence levels associated with a comparison of the extracted one or more features to a textual database and a geometric database using the computing device. Tax data is then transferred from the image to the portable electronic device or the remote computing device, wherein the tax data is automatically populated into one or more corresponding fields contained within the tax preparation application, wherein the correspondence is based at least in part of the identified tax form.

BRIEF DESCRIPTION OF THE DRAWINGS

FIG. 3B illustrates a portion of an imaged document with the feature of detected lines being illustrated.

FIG. 3C illustrates a portion of an imaged document with the feature of a detected paragraph being illustrated.

DETAILED DESCRIPTION OF ILLUSTRATED EMBODIMENTS

Figure 1A:
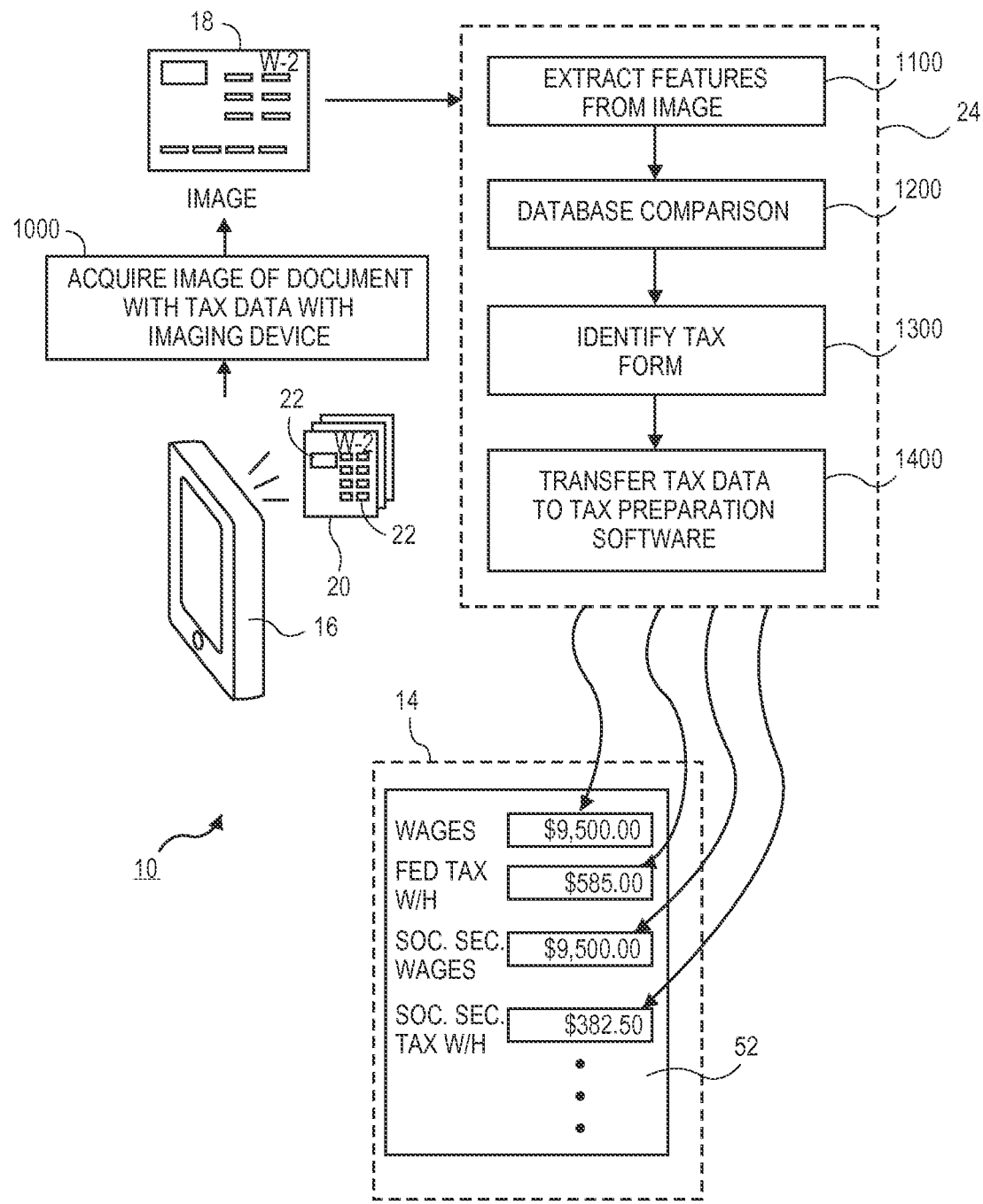
FIG. 1A is a schematic representation of one embodiment of a method of capturing tax data from one or more documents that is subsequently transferred to tax preparation application.
Figure 1B:
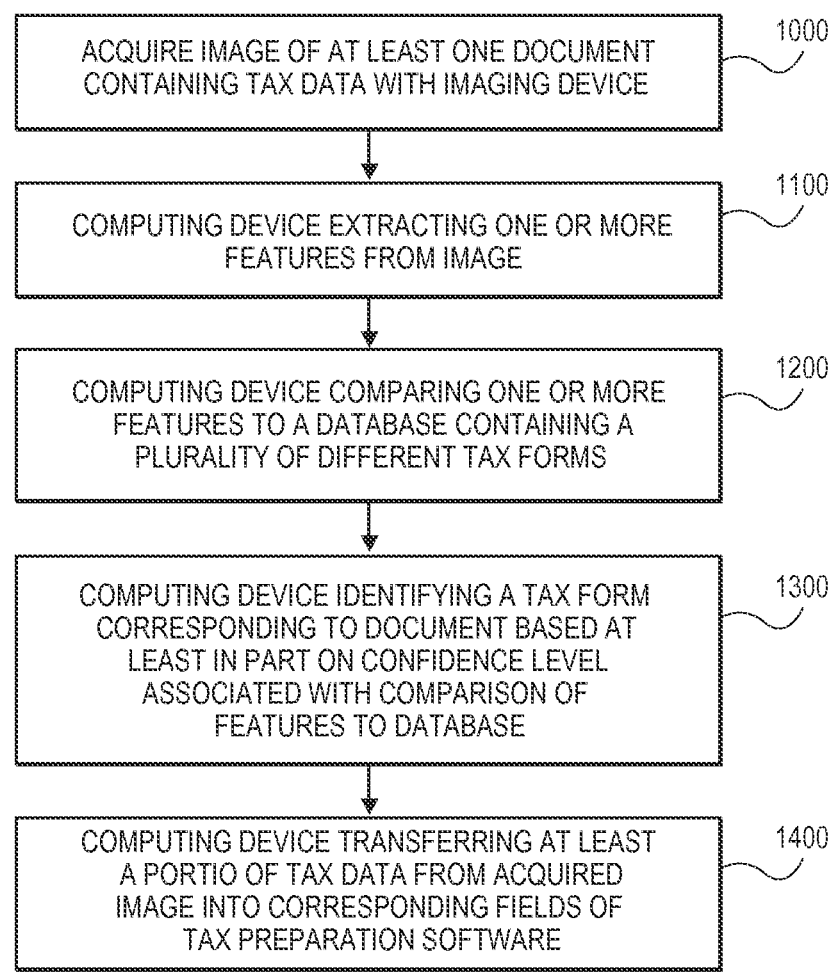
FIG. 1B if a flow chart illustrating the sequence of operations for one embodiment of a method of capturing tax data from one or more documents and transferring at least a portion of the data to tax preparation application.

FIGS. 1A and 1B illustrates a computer-implemented method 10 of acquiring tax data for use in the preparation of a tax form using tax preparation software, program or application 14 ("tax preparation application 14) according to a first embodiment. With reference to operation of 1000 of FIGS. 1A and 1B, an imaging device 16 acquires an image 18 of at least one document 20 containing tax data 22 therein. Document 20, as used herein, refers to a tangible medium that contains tax data 22 thereon or therein that is visually perceptible to the human eye. Typically, documents 20 may be made from a paper-based material but a variety of different materials may be used to form the ultimate document 20. The documents 20 may have any number of sizes and dimensions. The documents 20 may include single pages or multiple pages as the case may be.

In some embodiments, a single document 20 may contain tax data 22 that relates to a single tax form. For example, a W-2 form provided to an employee by an employer is often a single document 20 that contains tax data 22 that is specific to the requirements of the tax form W-2. In other embodiments, a single document 20 may contain tax data 22 that relates to multiple tax forms. For example, a financial institution may provide a customer a single document 20 that contains tax data 22 that relates to a 1099-INT tax form as well as tax data 22 that relates to a 1099-DIV tax form.

Figure 2A:
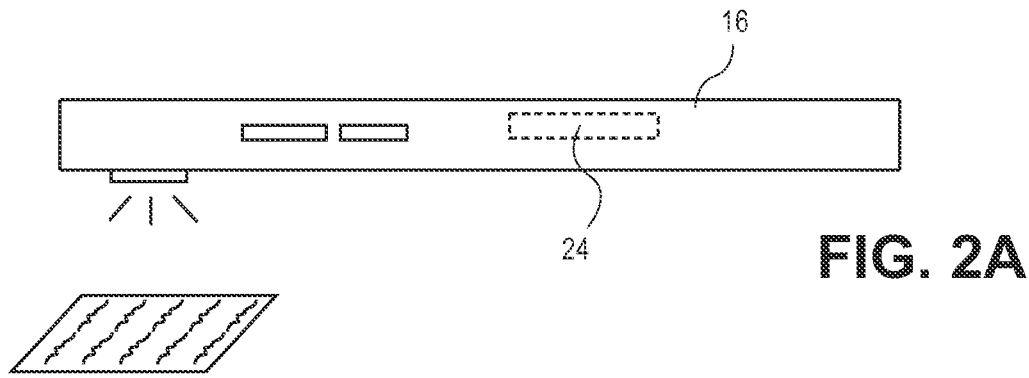
FIG. 2A illustrates an imaging device in the form of a portable electronic device such as a mobile phone having camera functionality.
Figure 2B:
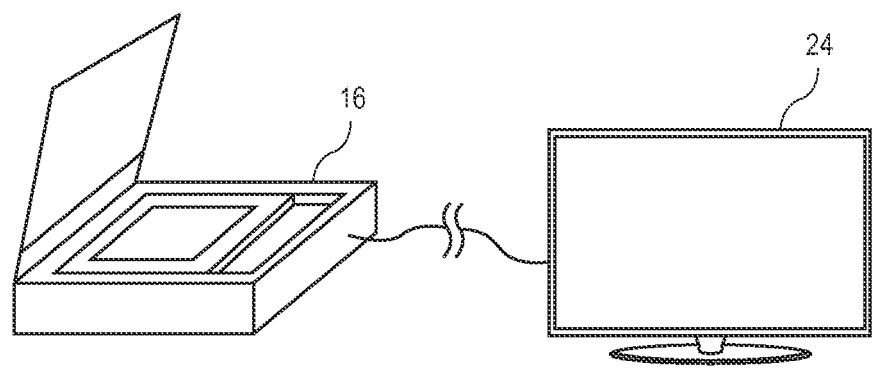
FIG. 2B illustrates an imaging device in the form of document scanner.
Figure 2C:
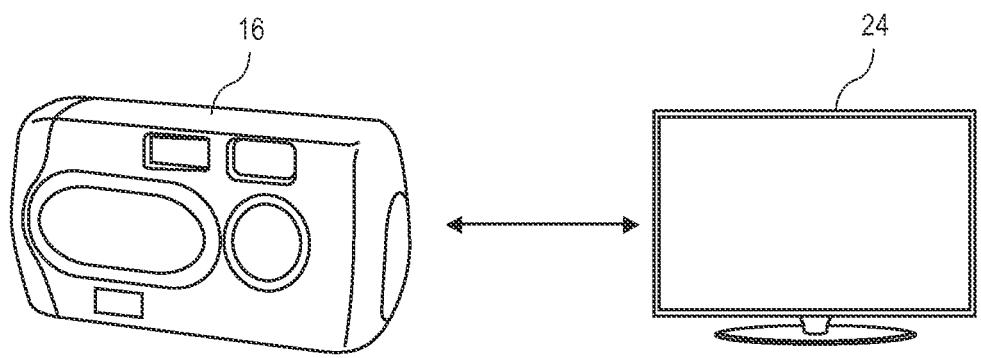
FIG. 2C illustrates an imaging device in the form of a camera.

The imaging device 16 illustrated in FIG. 1A may include a portable electronic device such as that illustrated in FIGS. 1A and 2A. One example of a portable electronic device includes a mobile phone such as a smartphone. Mobile phones with smartphone functionality typically have integrated cameras therein. Of course, other portable electronic devices such as tablets and the like that have camera functionality are also contemplated as imaging devices 16. FIG. 2B illustrates an imaging device 16 in the form of scanner. The scanner embodiment of FIG. 2B may be a standalone device or integrated into one or more other devices much like a multi-function printing device. FIG. 2C illustrates another embodiment of an imaging device 16 wherein a camera is the imaging device 16. It should be understood that imaging devices 16 other than those specifically referred to herein may also be used in connection with the methods and system described herein. For example, many tablet-based devices have cameras therein and may thus be considered one type of imaging device 16.

Tax data 22 that is contained within the document 20 generally relates to information that is used, in some manner, to prepare a tax return for a person, household, or other entity. Tax data 22 may include identification information that pertains to the individual, household, or entity that is preparing the tax return. For example, the name of the recipient of wages, tips, or other income is encompassed within the meaning of tax data 22. Tax data 22 may also include identification information pertaining to the person, entity, employer that is the source of wages, tips, or other income. Often such, information is identified on the document using one or more alphanumeric characters or text. Tax data 22 may also include numerical information that is embodied in the document 20 as monetary figures (e.g., amounts represents using numerals). For example, the entry "$10,000.00" may appear in document 20 under the heading "Other income." In this example, the numerical amount as well as the heading or association with the particular value constitute tax data 22. Tax data 22 may also include codes, check boxes, acronyms, symbols, graphics, and the like.

In one aspect of the invention, the tax data 22 is contained on or within documents 20 that are sent or otherwise made available to recipients as required by one or more Internal Revenue Service (IRS) codes or regulations. For example, exemplary documents 20 include the following IRS documents: W-2, 1099-A, 1099-B, 1099-C, 1099-DIV, 1099-G, 1099-H, 1099-INT, 1099-OID, 1099-LTC, 1099-PATR, 1099-Q, and 1098. This listing, however, should be understood as illustrative and not exhaustive.

Still referring to FIGS. 1A and 1B, a computing device 24 extracts one or more features 26 from the acquired image 18 of the document 20. The computing device 24 may a separate standalone device such as a computer or, alternatively, the computing device 24 may be integrated within the imaging device 16 For example, as seen in FIG. 2A, the computing device 24 may reside within the imaging device 16. In alternative embodiments, however, the computing device 24 may be a standalone device that is separate from the imaging device 16. In embodiments where the computing device 24 is separate from the imaging device 16, the image 18 may be transferred using a wired or wireless connection. In one embodiment of the system, the computing device 24 may be located remotely away from the imaging device 16. In this regard, the bulk of the computing and other processes handled by the computing device 24 may be offloaded to a remotely located computing device 24 with instructions and results being optionally returned to the imaging device 16, for example, where the imaging device 16 is a mobile device. In this embodiment, for example, the computing device 24 is located in a "cloud" arrangement whereby the image 18 is transmitted over a network to a remote location (or multiple locations) where image processing takes place. The results of the image processing as well as the identification of the particular tax form can then be returned to the user on the imaging device 16 or other local device. The image 18 obtained from the imaging device 16 may be in any number of formats. The image 18 may be created, for example, in one of the following formats: JPEG, GIF, BMP, PNG, TIFF, RAW, PDF, RTF and like.

Figure 1C:
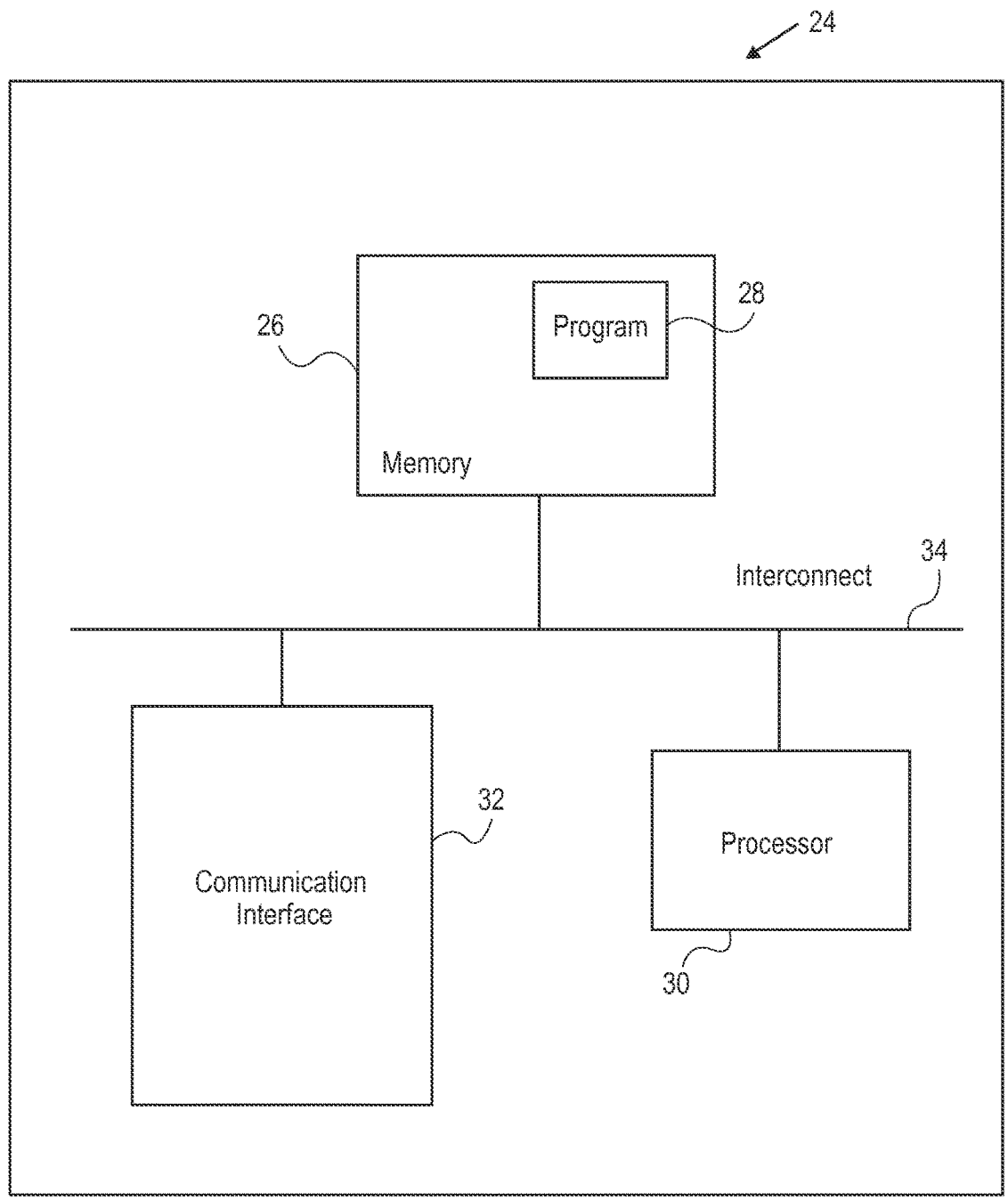
FIG. 1C illustrates a block diagram of components of a computing device or system in which various embodiments may be implemented or that may be utilized to execute embodiments.

FIG. 1C generally illustrates components of a computing device 24 that may be utilized to execute embodiments and that includes a memory 26, program instructions 28, a processor or controller 30 to execute account processing program instructions 28, a network or communications interface 32, e.g., for communications with a network or interconnect 34 between such components. The memory 26 may be or include one or more of cache, RAM, ROM, SRAM, DRAM, RDRAM, EEPROM and other types of volatile or non-volatile memory capable of storing data. The processor unit 30 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 34 may include a system bus, LDT, PCI, ISA, or other types of buses, and the communications or network interface may, for example, be an Ethernet interface, a Frame Relay interface, or other interface. The network interface 32 may be configured to enable a system component to communicate with other system components across a network which may be a wireless or various other networks. It should be noted that one or more components of computing device 24 may be located remotely and accessed via a network. Accordingly, the system configuration illustrated in FIG. 1C is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 30 performs steps or executes program instructions 28 within memory 26 and/or embodied on the carrier to implement method embodiments.

Figure 3A:
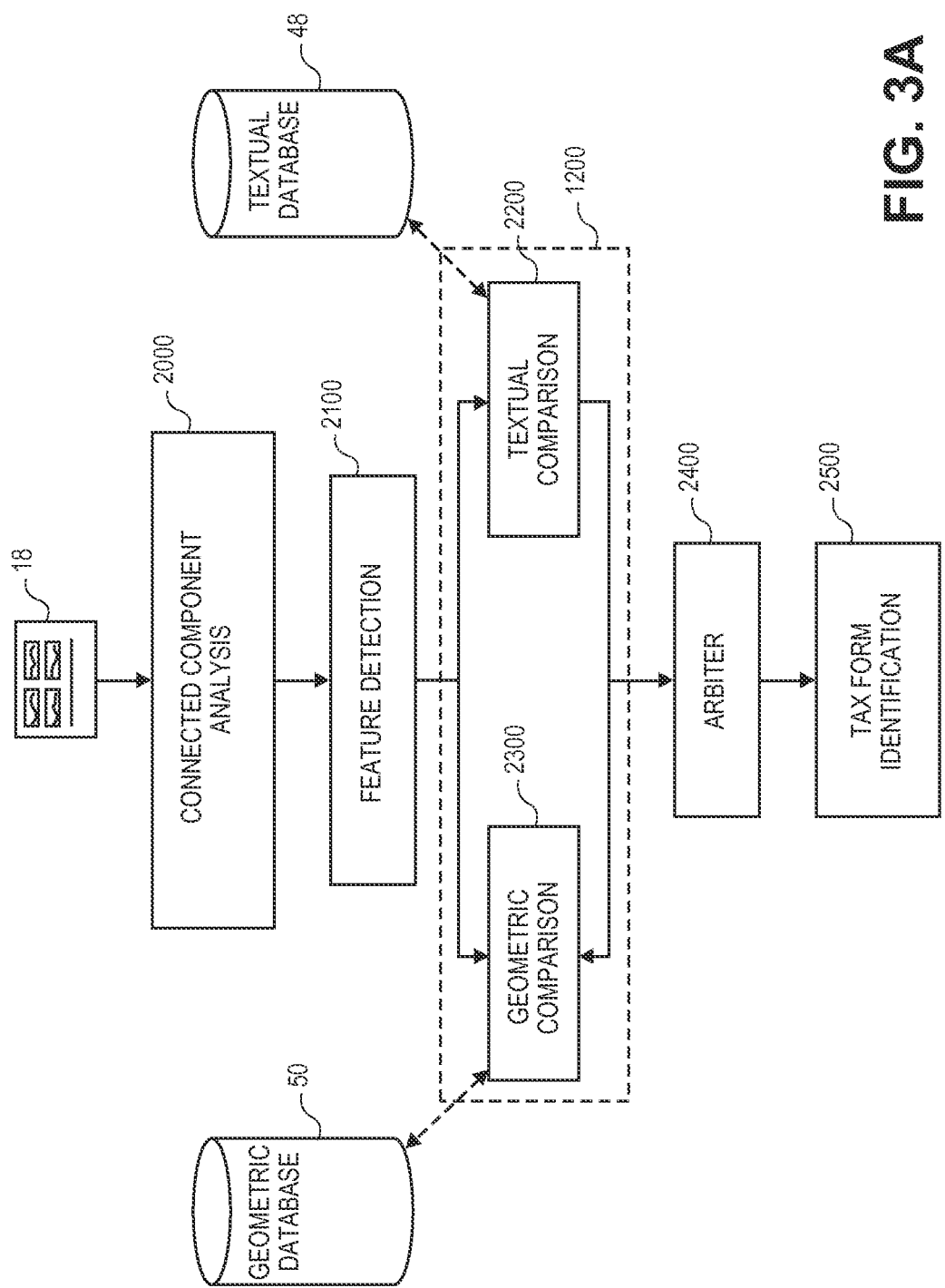
FIG. 3A illustrates one embodiment of a method of image analysis for the extraction and comparison of features used in connection with database comparisons for tax form identification.

Referring to FIGS. 1A and 1B, the computing device 24 extracts one or more features from the acquired image 18. This process is illustrated by operation 1100 in FIGS. 1A and 1B. FIG. 3A illustrates one particular embodiment of how features are extracted from acquired images 18. In this embodiment, images 18 are subject to connected component analysis as illustrated in operation 2000 of FIG. 3A. The connected component analysis 2000 is a lower-level image analysis process performed on the image 18 to identify and find connected pixels within the image 18. Connected pixels within the image 18 are connected "dark" regions contained within the image 18. The connected pixels may include text or graphical elements such as lines, separators or the like. The connected component analysis 2000 is able to identify these connected pixels within the image 18. In one embodiment, the component analysis 2000 is carried out using an optical character recognition (OCR) engine which runs as software on the computing device 24.

Still referring to FIG. 3A, after component analysis 2000 is performed feature detection 2100 takes place to determine the type of image feature that is present. More specifically, feature detection 2100 takes as an input a list of connected components from the OCR engine and classifies the identified connected pixels into different categories of features. As an example, feature detection 2100 may classify the connected pixels into titles, separators, whitespaces, colored areas, paragraphs or images. Titles are large or significant blocks of text which tend to identify the type of document 20. Separators are graphical indicia which tend to be unique to a particular type of document 20. Examples of sub-categories of separators include, by way of example, page headings, underlines, section separators, lines, and boxes. Whitespaces are those regions within the image 18 that contain no text which also tends to be a unique identifier as to the type of document 20. Paragraphs are sections of raw text that satisfy criteria of line drift and spatial continuity. Images are pictures or graphical elements present on the document 20.

FIG. 3B illustrates feature detection 2100 being performed on a portion of an image 18 of a document 20 which identifies detected lines 40. FIG. 3C illustrates feature detection 2100 being performed on a portion of an image 18 of a document 20 which identifies a paragraph feature 42 (shown in outline) with raw OCR output contained therein.

Returning to FIG. 3A, after the features within the image 18 have been detected, the features are then compared with a database that associates these features with different tax forms in order to classify the tax form that corresponds to the document 20 that was imaged. This process is illustrated in FIGS. 1A and 1B as operation 1200. FIG. 3A illustrates the database comparison operation 1200 being separated into two comparison operations identified as operations 2200 and 2300. With reference to the specific embodiment of FIG. 3A, the database comparison operations 2200 and 2300 are made with respect to a textual database 48 and a graphical database 50, respectively. The database comparison 2200 made with the textual database 48 compares text obtained from the image 18 using OCR with text stored in the database 48 that is associated with a particular tax form. The textual database 48 contains a pre-trained database that associates text with particular tax forms. In one embodiment, the comparison with the textual database 48 yields a confidence level that is associated with a particular tax form. For example, if the text that is compared within the textual database 48 includes the words "qualified dividends" this may yield a high confidence level that the document 20 that was imaged was a 1099-DIV. The confidence level may be expressed in numerical terms as a percentage, value, vector, or the like. As one illustrative example, the textual database 48 may associate a confidence value of 0.92 that the imaged document is a 1099-DIV based solely on textual comparison. The textual database 48 may be used with a variety of text-based classification algorithms. These include so called "bag-of-word" classifications schemes (e.g., Bayesian bigram models).

Still referring to FIG. 3A, the method also involves a database comparison 2300 that is made with respect to a graphical database 50. The graphical database 50 associates the locations, size, orientation, feature type and relations to other features for a plurality of different tax documents. The graphical database 50 contains a pre-trained dataset that associates geometric features with a specific set of tax forms. For example, with respect to the feature type, the graphical database 50 may contain information pertaining to titles, separators, whitespaces, colored areas, paragraphs, or images (e.g., feature types) for each unique tax document. This information may also include dimensional or positional information pertaining to individual features or dimensional or positional interrelationships of multiple features. By considering the geometric features of the tax form (as opposed to just text), the method is able to increase classification accuracy compared to traditional text only approaches.

The comparison 2300 made with the graphical database 50 can compare, for example, the feature type obtained from the feature detection 2100 with known feature data contained in the graphical database. According to one embodiment, the comparison with the graphical database 50 yields a confidence level that is associated with a particular tax form. For example, if the image 18 contains two columns of similarly sized boxes located on one side of a document that are located adjacent to a larger box (e.g., for employer's name), the comparison made with the graphical database 50 may yield a high confidence level that the document 20 that was imaged was a W-2. The graphical comparison 2300 may also find that a graphical image of "W-2" was found on the document that further increases the confidence level that the document 20 that was imaged was a W-2 form. The confidence level may be expressed in numerical terms as a percentage, value, vector, or the like. As one illustrative example, the graphical database 50 may associate a confidence value of 0.95 that the imaged document is a W-2 based solely on graphical comparison. The graphical database 50 is powered by a statistical model that uses a pre-trained database of known feature associations. For example, one model that can be used is powered by a soft-margin support vector machine (SVM) with a radial basis function (RBF) kernel.

In some embodiments, both the textual database 48 and the graphical database 50 will identify the same tax form based on their respective database comparisons. For example, a document 20 may be imaged which is determined to be a W-4 form by both the textual database 48 and the graphical database 50. In such a situation, the computing device 24 identifies the tax form (in this example W-4) as illustrated by operation 1300 in FIGS. 1A and 1B (or operation 2500 in FIG. 3A). The computing device 24 may then transfer at least a portion of the tax data from the imaged document 20 into corresponding fields of interview screens or forms generated by tax preparation application 14. This process is illustrated in operation 1400 in FIGS. 1A and 1B. For example, as best seen in FIG. 1A, text contained in various data fields (e.g., EIN, names, addresses, codes, dollar amounts) used in the imaged W-4 document are transferred to corresponding fields of a screen or form generated by tax preparation application 14. FIG. 1A illustrates a screen representation 52 of tax preparation application 14 being automatically populated with data contained in the imaged document 20.

In operation 1400, because the tax form that has been imaged has been identified, the OCR engine can then be used to selectively capture those data fields that are to be transferred to the tax preparation application program 14. The correct correspondence between the tax data 22 contained in the document 20 and the data fields of the tax preparation application program 14 is thus obtained without any need on the part of the user to input the type of tax form that was imaged. For example, if the algorithm identifies the document 20 as a 1099-R, one or more fields from the imaged may be mapped to corresponding fields contained in the tax preparation application program 14.

In one embodiment of the invention, for example, when the imaging device 16 is a portable electronic device such as a smartphone, the tax preparation application 14 may be running on the smartphone device. In such an embodiment, the image 18 was transferred to a computing device 24 that is remotely located (e.g., cloud based configuration) with respect to the smartphone device. The processes of feature extraction, database comparison, and tax form identification can thus take place on the remotely located computing device 24. Once the tax form has been identified, the computing device 24 may then communicate with the imaging device 16 to then transfer tax data obtained from the image 18 to software 14 contained on the imaging device 16. Data transfer may be accomplished over a wireless network such as those used by commercial telecommunication firms or over a publicly accessible network such as the Internet.

In another embodiment of the invention, the same computing device 24 that runs the tax preparation application 14 may also be used for feature extraction, database comparison and tax form identification. The computing device 24 may be located on the imaging device 16. Alternatively, the computing device 24 may be separate from the imaging device 16 but used to receive images 18 such as the embodiment illustrated in FIGS. 2B and 2C.

Referring back to FIG. 3A, there may be instances where the tax form identified as a result of the comparison of the textual database 48 and the tax form identified as a result of the comparison of the graphical database 50 are in conflict. In such a conflict an arbiter 2400 is used to determine the final tax form that will be used. In one embodiment, the arbiter 2400 may use the classification algorithm (i.e., graphical or textual) with the highest confidence value. In another embodiment, the arbiter 2400 may use a pre-trained weighting on a training set of documents to determine which classification algorithm prevails. For example, based on prior training, it may be known that if the document 20 is suspected to be a 1099-INT or 1099-DIV, the comparison using the textual database 48 should prevail. Conversely, based on prior training, it may be known that if the document 20 is suspected to be a W-2, the comparison using the graphical database 50 should prevail. Generally, certain tax documents may be associated with a favored database 48, 50 for comparison and classification purposes. Of course, other weightings between the two databases 48, 50 may also be used for the arbiter 2400.

Figure 4:
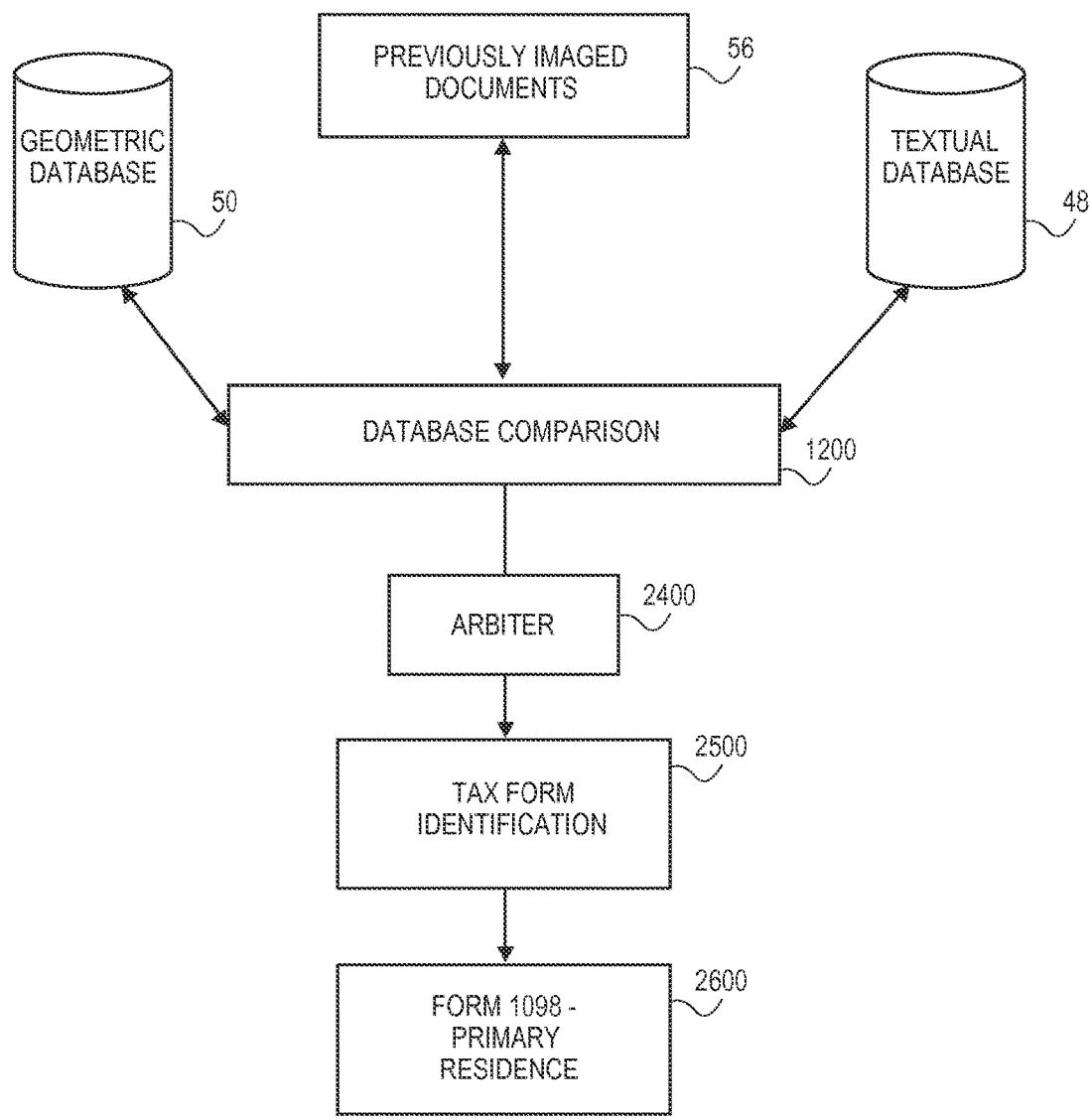
FIG. 4 illustrates another embodiment which uses database comparison of features using a textual database, a geometric database, as well as information contained in one or more previously imaged documents.

FIG. 4 illustrates another embodiment of the method. In this embodiment, the database comparison 1200 operation utilizes the textual database 48, the graphical database 50, as well as a dataset 56 of previously imaged documents 20. The dataset 56 of previously imaged documents 20 is used to better refine the classification of one or more images 18. For example, a person or household may engage in financial transactions with a number of financial institutions, each of which may report year end or other periodic tax data. For example, a household may have a mortgage from BANK#1 on the household personal residence and a mortgage from BANK#2 on a rental unit that is owned by the household. At year end, both financial institutions may send tax or other reporting documents that list interest paid during the prior year. In order to prepare his or her tax return, the user needs to find the amount of mortgage interest paid on the household's principal residence. In this embodiment, the dataset 56 of previously imaged documents may indicate that the vast majority of recipient addresses of the previously imaged documents match the property address listed on the mortgage document sent by BANK#1 as opposed to the mortgage document sent by BANK#2. The database comparison operation 1200 can thus use this information to properly infer that the interest reported by BANK#1 corresponds to interest paid on the household's principal's residence. The method thus identifies that the document 20 is a Form 1098 in operation 2500 and further identifies in operation 2600 that the document 20 is a Form 1098 for the household's primary residence.

Figure 5:
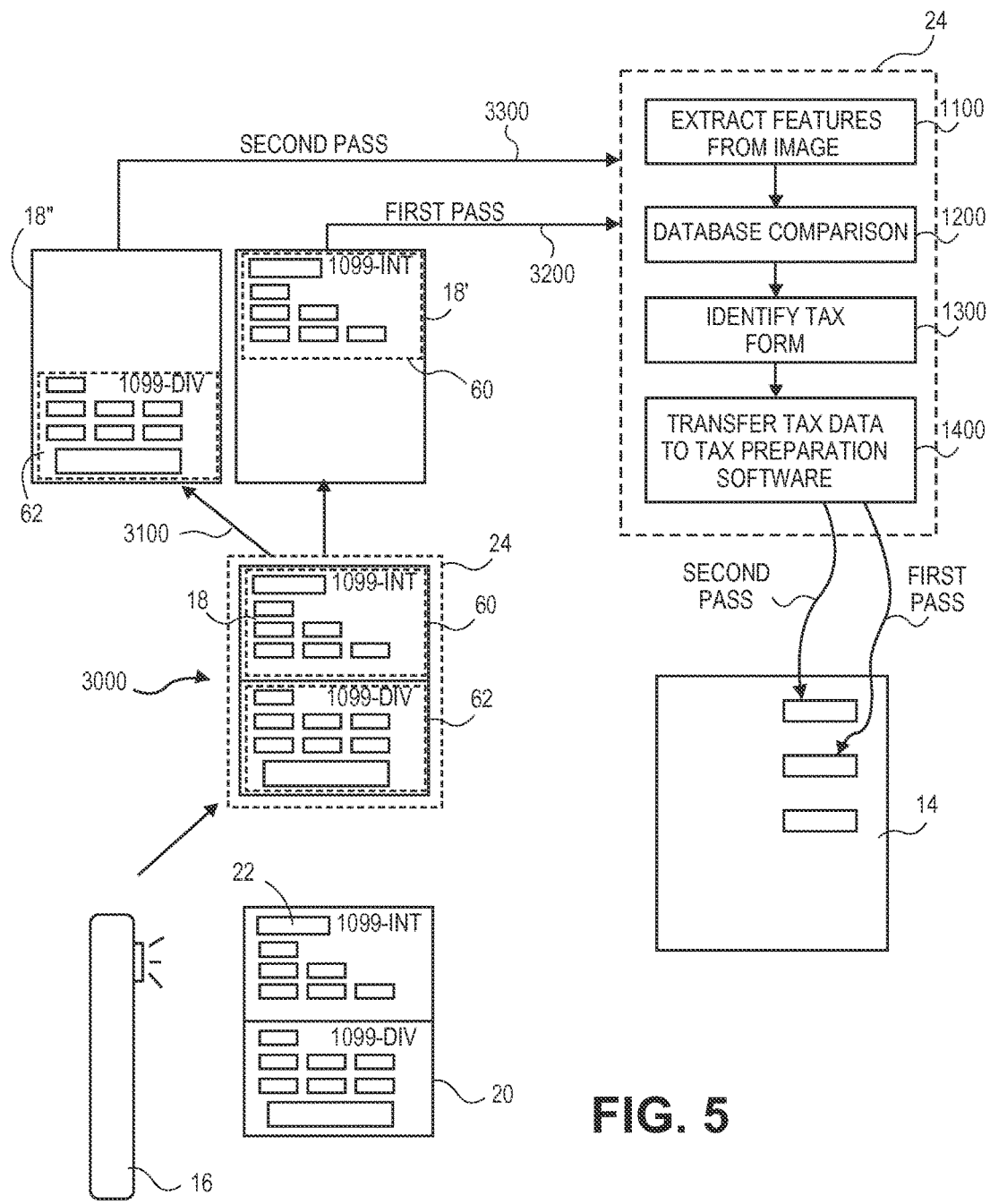
FIG. 5 illustrates another embodiment of a method of capturing tax data from one or more documents that is subsequently transferred to tax preparation application.

FIG. 5 illustrates another embodiment of a method of acquiring tax data for use in tax preparation application 14. In this embodiment, an imaging device 16 such as a mobile phone is used to image documents 20 as in the prior embodiments. In this embodiment, however, a single document 20 contains tax data 22 that is relevant to multiple tax forms. For example, as illustrated in FIG. 5, the document 20 contains tax data 22 relevant to both 1099-INT and 1099-DIV tax forms.

Referring to operation 3000, the image 18 of the document 20 is subject to image analysis to identify and separate those discrete portions of the document 20 that contain tax data 22 specific to different tax forms. This may be accomplished, for example, by using the OCR engine running on the computing device 24. On one aspect, as illustrated in FIG. 5, the document is divided into separate regions 60, 62 which each region containing image data relevant to a specific tax form. In operation 3100, only one of the regions 60, 62 is then made available to for further processing by the image processing algorithm discussed above. For example, the single image 18 may parsed or otherwise divided into multiple images 18', 18" with each image only containing one of the regions 60, 62. In FIG. 5, image 18' contains the region 60 of image 18 while image 18" contains the region 62 of image 18. As explained below, during image processing, one region 60, 62 is ignored while the other is subject to image processing.

As seen in operation 3200 a first pass is made through the image processing algorithm discussed previously using the image 18'. The image 18' has features extracted as illustrated in operation 1100. A database comparison 1200 is made to identify the relationships of the features found in the image 18' with those contained in one or more databases. As seen in operation 1300, a tax form is identified that corresponds to the image 18'. In this example, the tax form that would be identified is 1099-INT. Still referring to FIG. 5, the tax data 22 from the image 18' can be transferred to the tax preparation application as seen in operation 1400. Next, the image 18" that contains region 62 is then run through the algorithm discussed previously in a second pass 3300. The image 18" has features extracted as illustrated in operation 1100. A database comparison 1200 is made to identify the relationships of the features found in the image 18" with those contained in one or more databases. As seen in operation 1300, a tax form is identified that corresponds to the image 18". In this example, the tax form that would be identified is 1099-DIV. The tax data 22 from the image 18" can be transferred to the tax preparation application as seen in operation 1400.

While FIG. 5 has been described as transferring tax data 22 to tax preparation application 14 after each pass 3200, 3300 it should be understood that tax data 22 could be transferred to the tax preparation application 14 in a single step after all passes have been made. Moreover, FIG. 5 has been described in the context of a single document 20 containing two tax forms. It should be understood that the document 20 may contain tax data 22 pertaining to even more tax forms. For example, a stock investment account may send to the owner a Form 1099 Composite that contains tax data 22 pertaining to 1099-DIV, 1099-B, and 1099-INT. In this embodiment, three such passes would be needed. Of course, even more such passes are contemplated by the method and system described herein.

With respect to any of the embodiments described herein, it should be understood that a plurality of different documents 18 may be imaged all at once by the user. Multiple images may then be processed using the computing device 24. The tax data 22 which is extracted from the documents 18 is associated with a particular tax form and then automatically transferred to tax preparation application 14. Alternatively, each document 18 may be scanned and with tax data 22 transferred to the tax preparation application 14 in a serial fashion (i.e., document by document).

While the embodiments described herein have generally been directed to a system or method, other embodiments may be directed to a computer program product or article of manufacture that includes a non-transitory computer readable medium. The non-transitory computer readable medium tangibly embodies one or more sequences of instructions that are configured for execution by one or more computing devices for realizing the systems and methods described herein.

The non-transitory computer readable medium may be embodied on a storage device that is run on a computer (or multiple computers). This computer may be located with the user or even in a remote location, for example, in cloud-based implementations. The computer readable medium may be embodied in an application that is downloaded or downloadable to a device. For example, an application may be downloaded or otherwise transferred to a portable electronic device (e.g., mobile device) which is used in the methods and systems described herein.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

It will be understood that embodiments can be implemented using various types of computing or communication devices. For example, certain embodiments may be implemented utilizing specification of tax return questions, the content tree or other data structure, the rules utilized to alter factor values of functions may be included in a spreadsheet, for example, and a compiler to extract definitions and generate a javascript file for business logic and a user experience plan (based on the tree hierarchy). Mobile and web runtime can be created and that can consume generated files, and initiate user experience based on the content. When a user inputs data, embodiments may be triggered to execute during runtime to execute rules, adjust factor values resulting in modification of function outputs, and filter questions as necessary and re-order the visible questions based at least in part upon the function outputs. Embodiments, however, are not so limited and implementation of embodiments may vary depending on the platform utilized. Accordingly, embodiments are intended to exemplify alternatives, modifications, and equivalents that may fall within the scope of the claims.

Further, while embodiments have been described with reference to processing images of tax documents for purposes of preparing an electronic tax return utilizing a tax preparation application, embodiments may also be utilized with or executed by other financial management systems to image and process images of other types of documents. For example, other embodiments may involve other financial management systems utilized to analyze images of financial documents containing account and/or transaction data in connection with management of personal finances of the user of the financial management system.

Moreover, while certain embodiments have been described with reference to method steps performed in an exemplary order, it will be understood that various steps may be performed in different orders and/or concurrently. Flow diagrams are provided as non-limiting examples of how embodiments may be implemented.

Accordingly, embodiments are intended to exemplify alternatives, modifications, and equivalents that may fall within the scope of the claims.

What is claimed is:

1. A computer-implemented method for preparing at least a portion of an electronic tax return with a computerized tax preparation application, the computer-implemented method comprising:
   a computing device receiving an image of one or more documents containing tax data therein with an imaging device;
   the computing device processing the image by:
      extracting a plurality of features from the image of the one or more documents, wherein optical character recognition is performed on at least one of the features to output text,
      comparing the extracted one or more features and output text to a graphical database and a textual database, respectively, containing a plurality of different tax forms, and
      identifying a tax form corresponding to the one or more documents from the plurality of different tax forms based on a comparison of the extracted one or more features and the output text to the graphical database and the textual database, respectively; and
   the computing device transferring at least a portion of the tax data determined from the image into corresponding fields of the computerized tax preparation application to automatically prepare at least a portion of the electronic tax return.

2. The method of claim 1, wherein the extracted one or more features comprise at least one of a title, a separator, a whitespace, a paragraph, an image and associated location information of an extracted feature.

3. The method of claim 1, wherein a confidence level associated with a particular tax form of the plurality of tax forms is generated based at least in part on the comparison of the extracted one or more features to the graphical database.

4. The method of claim 3, wherein a confidence level associated with a particular tax form of the plurality of different tax forms is generated based at least in part on the comparison of the output text to the textual database.

5. The method of claim 4, wherein when the graphical database and the textual database identify different tax forms, the tax form having the highest confidence value is selected.

6. The method of claim 4, wherein when the graphical database and the textual database identify different tax forms, an arbiter identifies the tax form to be selected based on a pre-trained set of documents.

7. The method of claim 1, wherein the computing device identifies a tax form corresponding to the one or more documents from the plurality of different tax forms based at least in part on a dataset of previously imaged documents.

8. The method of claim 1, wherein the imaging device comprises one of a mobile phone or tablet.

9. The method of claim 8, wherein the computing device is contained in the mobile phone or tablet.

10. The method of claim 8, wherein the computing device is remotely located with respect to the mobile phone or tablet and the image of the at least one document containing tax data is transferred to the computing device over a network for processing of the image.

11. The method of claim 1, wherein the receive image is in a format selected from the group consisting of JPEG, GIF, BMP, PNG, TIFF, RAW, PDF and RTF.

12. The method of claim 1, wherein image processing comprises identification of dark pixels within the received image, wherein feature extraction is based at least in part upon identification of the dark pixels.

13. The method of claim 1, wherein the received image is an image of a tangible, paper document that contains tax data and that is visually perceptible to the human eye.

14. A computer-implemented method for preparing at least a portion of an electronic tax return, the computer-implemented method comprising:
  a computing device receiving an image of at least one document containing tax data therein with an imaging device;
  the computing device processing the image by:
    dividing the image the into a plurality of different image regions, wherein each image region contains image data relevant to a specific tax form,
    extracting one or more features from at least one of the image regions of the image based at least in part upon analysis of pixels of the region,
    comparing the extracted one or more features to a database containing a plurality of different tax forms, and
    identifying a tax form corresponding to the at least one image region from the plurality of different tax forms based at least in part on a confidence level associated with the comparison of the extracted one or more features to the database; and
  the computing device automatically transferring respective tax data determined from the at least one image region into respective fields of the electronic tax return to automatically prepare at least a portion of the electronic tax return.

15. The method of claim 14, further comprising:
  the computing device extracting one or more features from one of the remaining image regions based at least in part upon analysis of pixels of the remaining image regions, the computing device comparing the extracted one or more features to a database containing a plurality of different tax forms;
  the computing device identifying a tax form corresponding to the remaining image regions from the plurality of different tax forms based at least in part on a confidence level associated with the comparison of the extracted one or more features to the database; and
  the computing device automatically transferring respective tax data determined from the image into respective fields of the electronic tax return to automatically prepare at least a portion of the electronic tax return.

16. The method of claim 14, wherein the extracted one or more features comprise at least one of a title, a separator, a whitespace, a paragraph, an image and associated location information of an extracted feature.

17. The method of claim 14, wherein the database comprises a graphical database.

18. The method of claim 14, wherein the database comprises a textual database.

19. The method of claim 14, wherein the imaging device comprises one of a mobile phone or tablet.

20. The method of claim 19, wherein the computing device is contained in the mobile phone or tablet.

21. The method of claim 14, wherein the receive image is in a format selected from the group consisting of JPEG, GIF, BMP, PNG, TIFF, RAW, PDF and RTF.

22. The method of claim 14, wherein image processing comprises identification of dark pixels within the received image, wherein feature extraction is based at least in part upon identification of the dark pixels.

23. The method of claim 14, wherein the received image is an image of a tangible, paper document that contains tax data and that is visually perceptible to the human eye.

24. A system for automatically preparing at least a portion of an electronic tax return, the system comprising:
  a computing device configured to receive an image of one or more documents containing tax data therein, the computing device being configured to extract a plurality of features from the image of the one or more documents, wherein optical character recognition is performed on at least one of the features to output text;
  a graphical database containing a plurality of different tax forms, wherein the computing device compares the extracted features to contents of the graphical database and outputs a first confidence level for one or more of the different tax forms;
  a textual database containing a plurality of different tax forms, wherein the computing device compares the output text to contents of the textual database and outputs a second confidence level for one or more of the different tax forms;
  an arbiter executed by the computing device for resolving conflicts between the first confidence level and the second confidence level, wherein the computing device identifies a tax form corresponding to the one or more documents based on the first and second confidence levels, and
  wherein the computing device is further configured to populate at least one field of an interview screen generated by a computerized tax preparation application with at least a portion of the tax data determined from the received image of the one or more documents to automatically prepare at least a portion of the electronic tax return.

25. The system of claim 24, wherein the computing device further comprises an imaging device for imaging the one or more documents.

26. The system of claim 24, wherein the computerized tax preparation application is located on a mobile communications device.

27. The system of claim 24, wherein the computing device is configured to process the received image in a format selected from the group consisting of JPEG, GIF, BMP, PNG, TIFF, RAW, PDF and RTF.

28. The system of claim method of claim 24, wherein the computing device is configured to perform image processing comprising identifying dark pixels within the received image, wherein feature extraction is based at least in part upon identification of the dark pixels.

29. The method of claim 24, wherein the received image is an image of a tangible, paper document that contains tax data and that is visually perceptible to the human eye.

* * * * *